United States Patent
Virtue, Jr. et al.

(10) Patent No.: US 10,443,505 B2
(45) Date of Patent: Oct. 15, 2019

(54) BOWED ROTOR START MITIGATION IN A GAS TURBINE ENGINE

(71) Applicant: United Technologies Corporation, Farmington, CT (US)

(72) Inventors: John P. Virtue, Jr., Middletown, CT (US); Amy R. Grace, Ellington, CT (US); Parakrama Herath, Avon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 379 days.

(21) Appl. No.: 15/042,368

(22) Filed: Feb. 12, 2016

(65) Prior Publication Data
US 2017/0234231 A1    Aug. 17, 2017

(51) Int. Cl.
| | | |
|---|---|---|
| F02C 7/26 | (2006.01) | |
| F02C 7/268 | (2006.01) | |
| B64F 5/00 | (2017.01) | |
| B64D 31/06 | (2006.01) | |

(52) U.S. Cl.
CPC ............. *F02C 7/268* (2013.01); *B64D 31/06* (2013.01); *B64F 5/0045* (2013.01); *F05D 2270/303* (2013.01); *F05D 2270/334* (2013.01)

(58) Field of Classification Search
CPC ... F02C 7/268; B64D 31/06; F05D 2270/303; F05D 2270/334; F01D 19/00; F01D 19/02; G01H 1/003; G01H 1/006
See application file for complete search history.

(56) References Cited

U.S. PATENT DOCUMENTS

| | | |
|---|---|---|
| 1,951,875 A | 3/1934 | Laabs |
| 2,617,253 A | 11/1952 | Fusner et al. |
| 2,962,597 A | 11/1960 | Evans |
| 3,057,155 A | 10/1962 | Rizk |
| 3,151,452 A | 10/1964 | Bunger et al. |
| 3,290,709 A | 12/1966 | Whitenack, Jr. et al. |
| 3,360,844 A | 1/1968 | Wonneman |
| 3,764,815 A | 10/1973 | Habock et al. |
| 3,793,905 A | 2/1974 | Black et al. |

(Continued)

FOREIGN PATENT DOCUMENTS

| | | |
|---|---|---|
| EP | 1396611 | 3/2004 |
| EP | 1533479 A2 | 5/2005 |

(Continued)

OTHER PUBLICATIONS

U.S. Appl. No. 15/042,331 Non-Final Office Action dated Sep. 9, 2016, 37 pages.

(Continued)

*Primary Examiner* — Matthew W Jellett
(74) *Attorney, Agent, or Firm* — Cantor Colburn LLP

(57) ABSTRACT

A bowed rotor start mitigation system for a gas turbine engine is provided. The bowed rotor start mitigation system includes a controller operable to receive a vibration input indicative of an actual vibration level of the gas turbine engine and a speed input indicative of a rotor speed of the gas turbine engine. The controller generates a bowed rotor start mitigation request based on comparing the actual vibration level to a modeled vibration level at the rotor speed.

16 Claims, 8 Drawing Sheets

(56) References Cited

U.S. PATENT DOCUMENTS

| | | | |
|---|---|---|---|
| 3,898,439 A | 8/1975 | Reed et al. | |
| 3,951,008 A | 4/1976 | Schneider et al. | |
| 4,044,550 A | 8/1977 | Vermilye | |
| 4,069,424 A | 1/1978 | Burkett | |
| 4,120,159 A * | 10/1978 | Matsumoto | F01D 17/18 290/40 C |
| 4,144,421 A | 3/1979 | Sakai | |
| 4,302,813 A * | 11/1981 | Kurihara | F01D 19/00 702/56 |
| 4,353,604 A | 10/1982 | Dulberger et al. | |
| 4,380,146 A | 4/1983 | Yannone et al. | |
| 4,426,641 A * | 1/1984 | Kurihara | G01H 1/003 340/681 |
| 4,435,770 A * | 3/1984 | Shiohata | G01M 1/34 700/279 |
| 4,437,163 A * | 3/1984 | Kurihara | G07C 3/00 702/56 |
| 4,453,407 A | 6/1984 | Sato et al. | |
| 4,485,678 A * | 12/1984 | Fanuele | G01H 1/003 700/279 |
| 4,488,240 A * | 12/1984 | Kapadia | G07C 3/00 700/74 |
| 4,496,252 A | 1/1985 | Horler et al. | |
| 4,598,551 A | 7/1986 | Dimitroff, Jr. et al. | |
| 4,627,234 A | 12/1986 | Schuh | |
| 4,642,782 A * | 2/1987 | Kemper | G05B 23/0278 702/185 |
| 4,669,893 A | 6/1987 | Chalaire et al. | |
| 4,713,985 A | 12/1987 | Ando | |
| 4,733,529 A | 3/1988 | Nelson et al. | |
| 4,747,270 A | 5/1988 | Klie et al. | |
| 4,854,120 A | 8/1989 | Nelson et al. | |
| 4,856,272 A * | 8/1989 | Putman | F01D 11/24 60/782 |
| 4,862,009 A | 8/1989 | King | |
| 4,979,362 A | 12/1990 | Vershure, Jr. | |
| 5,103,629 A | 4/1992 | Mumford et al. | |
| 5,123,239 A | 6/1992 | Rodgers | |
| 5,127,220 A | 7/1992 | Jesrai et al. | |
| 5,174,109 A | 12/1992 | Lampe | |
| 5,184,458 A | 2/1993 | Lampe et al. | |
| 5,201,798 A | 4/1993 | Hogan | |
| 5,349,814 A | 9/1994 | Ciokajlo et al. | |
| 5,388,960 A * | 2/1995 | Suzuki | F01D 25/12 415/108 |
| 6,146,090 A | 11/2000 | Schmidt | |
| 6,168,377 B1 | 1/2001 | Wolfe et al. | |
| 6,190,127 B1 | 2/2001 | Schmidt | |
| 6,318,958 B1 | 11/2001 | Giesler et al. | |
| 6,478,534 B2 | 11/2002 | Bangert et al. | |
| 6,498,978 B2 | 12/2002 | Leamy et al. | |
| 6,517,314 B1 | 2/2003 | Burnett et al. | |
| 6,558,118 B1 | 5/2003 | Brisson et al. | |
| 6,681,579 B2 | 1/2004 | Lane et al. | |
| 6,762,512 B2 | 7/2004 | Nelson | |
| 7,104,072 B2 | 9/2006 | Thompson | |
| 7,133,801 B2 | 11/2006 | Song | |
| 7,409,319 B2 | 8/2008 | Kant et al. | |
| 7,428,819 B2 | 9/2008 | Cataldi et al. | |
| 7,507,070 B2 | 3/2009 | Jones | |
| 7,543,439 B2 | 6/2009 | Butt et al. | |
| 7,587,133 B2 | 9/2009 | Franke et al. | |
| 7,742,881 B2 | 6/2010 | Muralidharan et al. | |
| 7,798,720 B1 | 9/2010 | Walsh | |
| 7,909,566 B1 | 3/2011 | Brostmeyer | |
| 7,972,105 B2 | 7/2011 | Dejoris et al. | |
| 8,090,456 B2 | 1/2012 | Karpman et al. | |
| 8,291,715 B2 | 10/2012 | Libera et al. | |
| 8,306,776 B2 | 11/2012 | Ihara et al. | |
| 8,770,913 B1 | 7/2014 | Negron et al. | |
| 8,776,530 B2 | 7/2014 | Shirooni et al. | |
| 8,820,046 B2 | 9/2014 | Ross et al. | |
| 8,918,264 B2 | 12/2014 | Jegu et al. | |
| 9,086,018 B2 | 7/2015 | Winston et al. | |
| 9,121,309 B2 | 9/2015 | Geiger | |
| 9,429,510 B2 | 8/2016 | Belsom et al. | |
| 9,699,833 B2 | 7/2017 | Broughton et al. | |
| 9,845,730 B2 | 12/2017 | Betti et al. | |
| 9,988,928 B2 | 6/2018 | Popescu et al. | |
| 2002/0173897 A1 | 11/2002 | Leamy et al. | |
| 2003/0145603 A1 | 8/2003 | Reed et al. | |
| 2004/0065091 A1 | 4/2004 | Anderson | |
| 2004/0131138 A1 | 7/2004 | Correia et al. | |
| 2006/0032234 A1 | 2/2006 | Thompson | |
| 2006/0188372 A1 | 8/2006 | Hansen | |
| 2006/0260323 A1 | 11/2006 | Moulebhar | |
| 2007/0031249 A1 | 2/2007 | Jones | |
| 2007/0151258 A1 | 7/2007 | Gaines et al. | |
| 2008/0072568 A1 | 3/2008 | Moniz et al. | |
| 2009/0246018 A1 | 10/2009 | Kondo et al. | |
| 2009/0301053 A1 | 12/2009 | Geiger | |
| 2009/0314002 A1 | 12/2009 | Libera et al. | |
| 2010/0095791 A1 | 4/2010 | Galloway | |
| 2010/0132365 A1 | 6/2010 | Labala | |
| 2010/0293961 A1 | 11/2010 | Tong et al. | |
| 2010/0326085 A1 | 12/2010 | Veilleux | |
| 2011/0077783 A1 | 3/2011 | Karpman et al. | |
| 2011/0146276 A1 | 6/2011 | Sathyanarayana et al. | |
| 2011/0153295 A1 | 6/2011 | Yerramalla et al. | |
| 2011/0296843 A1 | 12/2011 | Lawson, Jr. | |
| 2011/0308345 A1 | 12/2011 | Makulec et al. | |
| 2012/0031067 A1 | 2/2012 | Sundaram et al. | |
| 2012/0240591 A1 | 9/2012 | Snider et al. | |
| 2012/0266601 A1 | 10/2012 | Miller | |
| 2012/0297781 A1 * | 11/2012 | Manchikanti et al. | F01D 11/24 60/772 |
| 2012/0316748 A1 | 12/2012 | Jegu et al. | |
| 2013/0031912 A1 | 2/2013 | Finney et al. | |
| 2013/0091850 A1 | 4/2013 | Francisco | |
| 2013/0101391 A1 | 4/2013 | Szwedowicz et al. | |
| 2013/0134719 A1 | 5/2013 | Watanabe et al. | |
| 2013/0251501 A1 | 9/2013 | Araki et al. | |
| 2014/0060076 A1 | 3/2014 | Cortelli et al. | |
| 2014/0123673 A1 | 5/2014 | Mouze et al. | |
| 2014/0199157 A1 | 7/2014 | Haerms et al. | |
| 2014/0236451 A1 | 8/2014 | Gerez et al. | |
| 2014/0241878 A1 | 8/2014 | Herrig et al. | |
| 2014/0271152 A1 | 9/2014 | Rodriguez | |
| 2014/0301820 A1 | 10/2014 | Lohse et al. | |
| 2014/0318144 A1 | 10/2014 | Lazzeri et al. | |
| 2014/0334927 A1 | 11/2014 | Hammerum | |
| 2014/0366546 A1 | 12/2014 | Bruno et al. | |
| 2014/0373518 A1 | 12/2014 | Manneville et al. | |
| 2014/0373552 A1 | 12/2014 | Zaccaria et al. | |
| 2014/0373553 A1 | 12/2014 | Zaccaria et al. | |
| 2014/0373554 A1 | 12/2014 | Pech et al. | |
| 2015/0016949 A1 | 1/2015 | Smith | |
| 2015/0115608 A1 | 4/2015 | Draper | |
| 2015/0121874 A1 | 5/2015 | Yoshida et al. | |
| 2015/0128592 A1 | 5/2015 | Filiputti et al. | |
| 2015/0159625 A1 | 6/2015 | Hawdwicke, Jr. et al. | |
| 2015/0219121 A1 | 8/2015 | King | |
| 2015/0377141 A1 | 12/2015 | Foiret | |
| 2016/0236369 A1 | 8/2016 | Baker | |
| 2016/0245312 A1 | 8/2016 | Morice | |
| 2016/0265387 A1 | 9/2016 | Duong et al. | |
| 2016/0288325 A1 | 10/2016 | Naderer et al. | |
| 2017/0030265 A1 | 2/2017 | O'Toole et al. | |
| 2017/0218848 A1 | 8/2017 | Alstad et al. | |
| 2017/0233103 A1 | 8/2017 | Teicholz et al. | |
| 2017/0234158 A1 | 8/2017 | Savela | |
| 2017/0234166 A1 | 8/2017 | Dube et al. | |
| 2017/0234167 A1 | 8/2017 | Stachowiak et al. | |
| 2017/0234230 A1 | 8/2017 | Schwarz et al. | |
| 2017/0234232 A1 | 8/2017 | Sheridan et al. | |
| 2017/0234233 A1 | 8/2017 | Schwarz et al. | |
| 2017/0234235 A1 | 8/2017 | Pech | |
| 2017/0234236 A1 | 8/2017 | Feulner et al. | |
| 2017/0234238 A1 | 8/2017 | Schwarz et al. | |
| 2017/0236064 A1 * | 8/2017 | Kirschnick | G06Q 10/06 702/35 |
| 2017/0274390 A1 | 9/2017 | Clauson et al. | |

(56) References Cited

U.S. PATENT DOCUMENTS

| | | |
|---|---|---|
| 2018/0010480 A1 | 1/2018 | Hockaday et al. |
| 2018/0265223 A1 | 9/2018 | Teicholz et al. |
| 2018/0274390 A1 | 9/2018 | Clauson et al. |
| 2018/0327117 A1 | 11/2018 | Teicholz et al. |

FOREIGN PATENT DOCUMENTS

| | | |
|---|---|---|
| EP | 1862875 | 12/2007 |
| EP | 2006496 | 12/2008 |
| EP | 2305986 | 4/2011 |
| EP | 2363575 A2 | 9/2011 |
| EP | 2871333 | 5/2015 |
| EP | 3051074 | 8/2016 |
| FR | 2933131 | 1/2010 |
| GB | 1374810 | 11/1974 |
| GB | 2117842 | 10/1983 |
| GB | 2218751 | 11/1989 |
| IN | 201408865 | 5/2015 |
| JP | 2002371806 | 12/2002 |
| JP | 2004036414 | 2/2004 |
| WO | 9900585 | 1/1999 |
| WO | 2013007912 | 1/2013 |
| WO | 2014152701 | 9/2014 |
| WO | 2015030946 | 3/2015 |
| WO | 2016069303 | 5/2016 |

OTHER PUBLICATIONS

EP Application No. 17155584 Extended European Search Report dated Jul. 6, 2017, 9 pages.

EP Application No. 17155601 Extended European Search Report dated Jun. 30, 2017, 7 pages.

EP Application No. 17155612 Extended European Search Report dated Jul. 4, 2017, 8 pages.

EP Application No. 17155613 Extended European Search Report dated Jun. 27, 2017, 10 pages.

EP Application No. 17155683 Extended European Search Report dated Jun. 30, 2017, 8 pages.

EP Application No. 17155687 Extended European Search Report dated Jun. 16, 2017, 9 pages.

EP Application No. 17155698 Extended European Search Report dated Jun. 21, 2017, 9 pages.

EP Application No. 17155721 Extended European Search Report dated Jun. 27, 2017, 8 pages.

EP Application No. 17155793 Extended European Search Report dated Jun. 30, 2017, 10 pages.

EP Application No. 17155798 Extended European Search Report dated Jun. 30, 2017, 9 pages.

EP Application No. 17155807 Extended European Search Report dated Jul. 3, 2017, 8 pages.

Extended European Search Report for Application No. 17179407.6-1610 dated Dec. 5, 2017 (8 pp.).

EP Application No. 17155683 Office Action dated May 22, 2018, 2 pages.

EP Application No. 17155612.9 Office Action dated Oct. 2, 2018, 3 pages.

EP Application No. 17155698.8 Office Action dated Sep. 27, 2018, 3 pages.

EP Application No. 17155798.6 Office Action dated Sep. 21, 2018, 3 pages.

* cited by examiner

BOWED ROTOR START MITIGATION IN A GAS TURBINE ENGINE

BACKGROUND

This disclosure relates to gas turbine engines, and more particularly to an apparatus, system and method for mitigating a bowed rotor start condition in a gas turbine engine.

Gas turbine engines are used in numerous applications one of which is for providing thrust to an airplane. When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a "bowed rotor" condition it is undesirable to restart or start the engine.

Accordingly, it is desirable to provide a method and/or apparatus for detecting and preventing a "bowed rotor" condition.

BRIEF DESCRIPTION

A bowed rotor start mitigation system for a gas turbine engine is provided. The bowed rotor start mitigation system includes a controller operable to receive a vibration input indicative of an actual vibration level of the gas turbine engine and a speed input indicative of a rotor speed of the gas turbine engine. The controller generates a bowed rotor start mitigation request based on comparing the actual vibration level to a modeled vibration level at the rotor speed.

In addition to one or more of the features described above, or as an alternative to any of the foregoing embodiments, further embodiments may include where comparing the actual vibration level to the modeled vibration level at the rotor speed is triggered to be performed at a rotor speed threshold that is below a resonance speed of the gas turbine engine.

In addition to one or more of the features described above, or as an alternative to any of the foregoing embodiments, further embodiments may include where the controller is operable to perform the comparing of the actual vibration level to the modeled vibration level during a dry motoring mode of the gas turbine engine below a resonance speed of the rotor.

In addition to one or more of the features described above, or as an alternative to any of the foregoing embodiments, further embodiments may include where the controller drives motoring of the gas turbine engine to a bowed rotor mode determination speed that is less than a dry motoring mode speed to perform the comparing of the actual vibration level to the modeled vibration level at a range of rotor speeds up to the bowed rotor mode determination speed prior to reaching the dry motoring mode speed.

In addition to one or more of the features described above, or as an alternative to any of the foregoing embodiments, further embodiments may include where the controller periodically performs the comparing of the actual vibration level to the modeled vibration level in the dry motoring mode to determine whether bowed rotor mitigation has completed prior to reaching an engine starting time.

In addition to one or more of the features described above, or as an alternative to any of the foregoing embodiments, further embodiments may include where a motoring controller determines whether to reduce a motoring time determined by a risk model based on a result of comparing the actual vibration level to the modeled vibration level at the rotor speed.

In addition to one or more of the features described above, or as an alternative to any of the foregoing embodiments, further embodiments may include a digital storage unit that stores time and temperature data for the risk model, where the digital storage unit is operable to continue monitoring of temperature data while the gas turbine engine is shutdown.

In addition to one or more of the features described above, or as an alternative to any of the foregoing embodiments, further embodiments may include where metrics of attempted bowed rotor mitigation are recorded based on determining that the attempted bowed rotor mitigation was unsuccessful or incomplete.

An embodiment includes a gas turbine engine that includes a motoring system operable to drive rotation of the gas turbine engine and a vibration monitoring system operable to monitor actual vibration of the gas turbine engine. The gas turbine engine also includes an electronic engine control operable to receive a vibration input indicative of an actual vibration level from the vibration monitoring system and a speed input indicative of a rotor speed of the gas turbine engine. The electronic engine control generates a bowed rotor start mitigation request that drives the motoring system to perform bowed rotor mitigation based on comparing the actual vibration level to a modeled vibration level at the rotor speed.

In addition to one or more of the features described above, or as an alternative to any of the foregoing embodiments, further embodiments may include where the actual vibration level is sampled below twenty-five percent of a resonance speed of the rotor to predict whether vibration amplitude of the rotor will be unacceptable for transiting the resonance speed.

In addition to one or more of the features described above, or as an alternative to any of the foregoing embodiments, further embodiments may include where a maintenance request is triggered based on the actual vibration level exceeding a maintenance action threshold after completing an attempt of bowed rotor mitigation.

A method of bowed rotor start mitigation for a gas turbine engine includes receiving a vibration input indicative of an actual vibration level of the gas turbine engine. A speed input indicative of a rotor speed of the gas turbine engine is received. A controller generates a bowed rotor start mitigation request based on comparing the actual vibration level to a modeled vibration level at the rotor speed.

In addition to one or more of the features described above, or as an alternative to any of the foregoing embodiments, further embodiments may include determining whether to reduce a motoring time determined by a risk model based on a result of comparing the actual vibration level to the modeled vibration level at the rotor speed, where the risk model maps core temperature model data with time data and ambient temperature data to establish the motoring time as an estimated period of motoring to mitigate a bowed rotor of the gas turbine engine.

In addition to one or more of the features described above, or as an alternative to any of the foregoing embodiments, further embodiments may include continuing monitoring of temperature data while the gas turbine engine is shutdown, and comparing monitored temperature data with modeled temperature data to validate one or more temperature models of the gas turbine engine.

In addition to one or more of the features described above, or as an alternative to any of the foregoing embodiments, further embodiments may include recording metrics of attempted bowed rotor mitigation based on determining that the attempted bowed rotor mitigation was unsuccessful or incomplete.

A technical effect of the apparatus, systems and methods is achieved by using a start sequence for a gas turbine engine as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
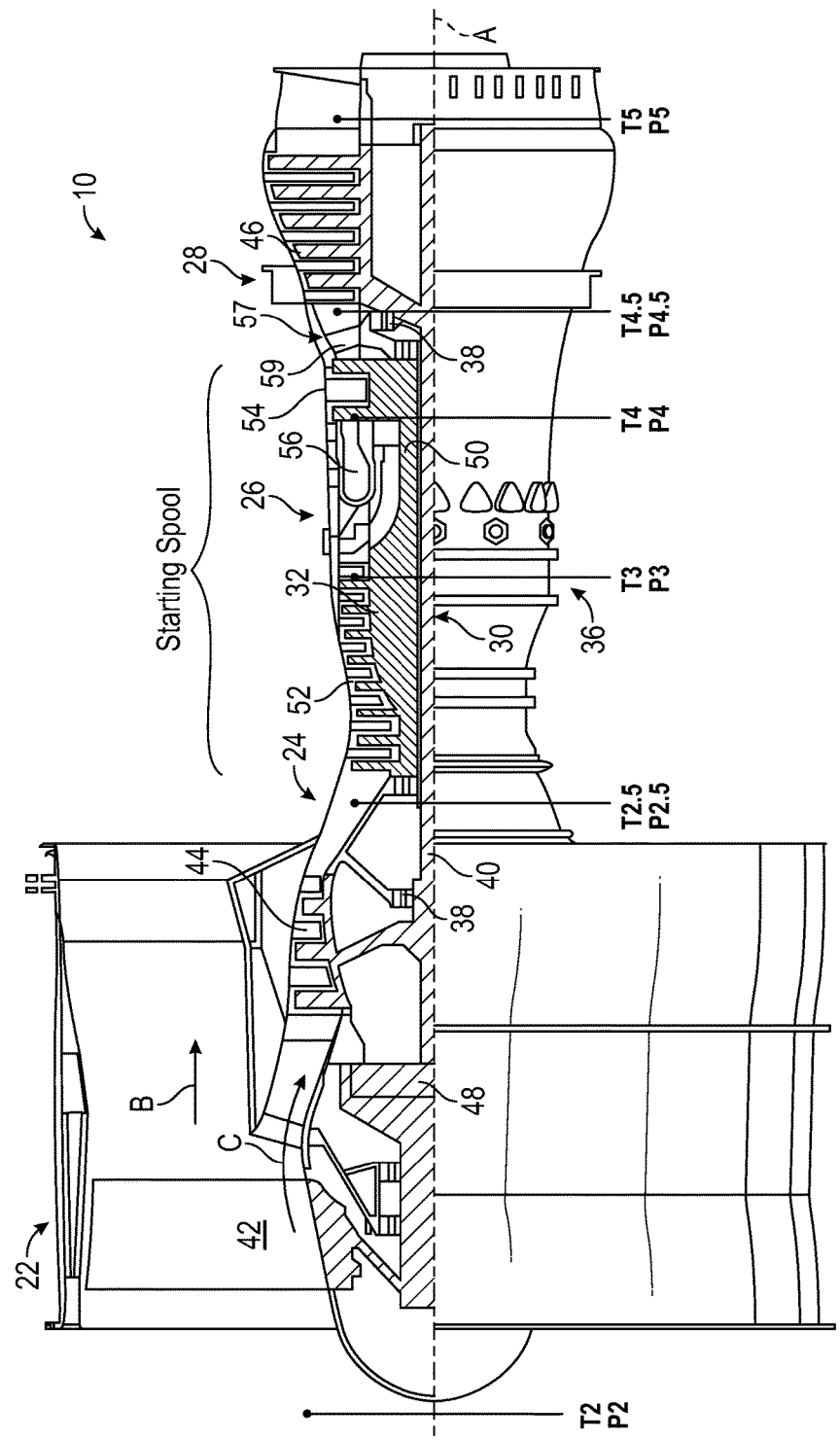
FIG. 1 is a cross-sectional view of a gas turbine engine.

Various embodiments of the present disclosure are related to a bowed rotor start mitigation system in a gas turbine engine. Embodiments can include a reduced order thermal model used to estimate heat stored in an engine core at shutdown and identify a risk of a bowed rotor in the gas turbine engine. Information from the thermal model can be used by a risk model to calculate a bowed rotor risk parameter. As used herein the term "model" may be referred to in one non-limiting manner as a process for representing real world values, measurements or conditions through the use of a computer program or algorithm. The bowed rotor risk parameter may be used to take a control action to mitigate the risk of starting the gas turbine engine with a bowed rotor. The control action can include performing dry motoring as further described herein.

During dry motoring, a starter valve can be actively adjusted to deliver air pressure from an air supply to an engine starting system that controls starting rotor speed. Dry motoring may be performed by running an engine starting system at a lower speed with a longer duration than typically used for engine starting while dynamically adjusting the starter valve to maintain the rotor speed and/or follow a dry motoring profile. Some embodiments increase the rotor speed of the starting spool to approach a critical rotor speed gradually and as thermal distortion is decreased they then accelerate beyond the critical rotor speed to complete the engine starting process. The critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in the high pressure compressor if the rotor is straddle-mounted.

In some embodiments, a targeted rotor speed profile of the dry motoring profile can be adjusted as dry motoring is performed. As one example, if excessive vibration is detected as the rotor speed rises and approaches but remains well below the critical rotor speed, then the rate of rotor speed increases scheduled in the dry motoring profile can be reduced (i.e., a shallower slope) to extend the dry motoring time. Similarly, if vibration levels are observed below an expected minimum vibration level as the rotor speed increases, the dry motoring profile can be adjusted to a higher rate of rotor speed increases to reduce the dry motoring time.

A full authority digital engine control (FADEC) system or other system may send a message to the cockpit to extend time at idle to cool down the rotor prior to shut down. If the engine is in a ground test or in a test stand, a message can be sent to the test stand or cockpit based on the control-calculated risk of a bowed rotor. A test stand crew can be alerted regarding a requirement to bring the starting spool of the engine to a speed below the known resonance speed of the rotor in order to homogenize the temperature of the rotor and the casings about the rotor which also are distorted by temperature non-uniformity.

Vibration data can be used as an alternate or supplemental source of bowed rotor data in combination with the risk model. For example, the vibration data can be used to generate a bowed rotor start mitigation request including an estimated need and duration of dry motoring. The duration of dry motoring may be reduced based on vibration analysis results as compared to a motoring time computed by the risk model. Limiting the performance of dry motoring to engines at risk of a bowed rotor condition and lower motoring time reduces the impact to component life of the engine starting system. Further, vibration signatures can be monitored after bowed rotor mitigation is performed during an engine start sequence to confirm success of bowed rotor mitigation. If bowed rotor mitigation is unsuccessful or determined to be incomplete by the FADEC, resulting metrics (e.g., time, date, global positioning satellite (GPS) coordinates, vibration level vs. time, etc.) of the attempted bowed rotor mitigation can be recorded and/or transmitted to direct maintenance.

According to various embodiments, there are a number of options available to mitigate a bowed rotor start depending on a present operating state of the gas turbine engine, instrumentation, and monitoring systems implemented. For example, a control-calculated risk of a bowed rotor can be computed as a bowed rotor risk parameter as further described herein and used to trigger a cockpit message or test stand message to extend a time period to run at idle power prior to engine shutdown as a pre-shutdown mitigation. Alternatively, the bowed rotor risk parameter can trigger a request message or automated initiation of a dry motoring sequence prior to engine start. During a dry motoring sequence, a starter air pressure valve can be modulated to limit high rotor speed below high spool resonance speed and prevent rub during dry motoring operation. The bowed rotor risk parameter can also be used to limit dry motoring duration to reduce the impact on air starter turbine life. The monitoring of vibration signatures during the entire engine starting sequence can also or separately be used to assess the risk of a bowed rotor start and direct maintenance, for instance, in the case of suspected outer air seal rub especially in the high compressor.

Referring now to FIG. 1, a schematic illustration of a gas turbine engine 10 is provided. The gas turbine engine 10 has among other components a fan through which ambient air is propelled into the engine housing, a compressor for pressurizing the air received from the fan and a combustor wherein the compressed air is mixed with fuel and ignited for generating combustion gases. The gas turbine engine 10 further comprises a turbine section for extracting energy from the combustion gases. Fuel is injected into the combustor of the gas turbine engine 10 for mixing with the compressed air from the compressor and ignition of the resultant mixture. The fan, compressor, combustor, and turbine are typically all concentric about a central longitudinal axis of the gas turbine engine 10. Thus, thermal deflection of the components of the gas turbine engine 10 may create the aforementioned bowing or "bowed rotor" condition along the common central longitudinal axis of the gas turbine engine 10 and thus it is desirable to clear or remove the bowed condition prior to the starting or restarting of the gas turbine engine 10.

FIG. 1 schematically illustrates a gas turbine engine 10 that can be used to power an aircraft, for example. The gas turbine engine 10 is disclosed herein as a multi-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment with two turbines and is sometimes referred to as a two spool engine, it should be understood that the concepts described herein are not limited to use with turbofans as the teachings may be applied to other types of turbine engines including three-spool architectures. In both of these architectures the starting spool is that spool that is located around the combustor, meaning the compressor part of the starting spool is flowing directly into the combustor and the combustor flows directly into the turbine section.

The engine 10 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30 in the example of FIG. 1. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

A number of stations for temperature and pressure are defined with respect to the gas turbine engine 10 according to conventional nomenclature. Station 2 is at an inlet of low pressure compressor 44 having a temperature T2 and a pressure P2. Station 2.5 is at an exit of the low pressure compressor 44 having a temperature T2.5 and a pressure P2.5. Station 3 is at an inlet of the combustor 56 having a temperature T3 and a pressure P3. Station 4 is at an exit of the combustor 56 having a temperature T4 and a pressure P4. Station 4.5 is at an exit of the high pressure turbine 54 having a temperature T4.5 and a pressure P4.5. Station 5 is at an exit of the low pressure turbine 46 having a temperature T5 and a pressure P5.

Figure 9:
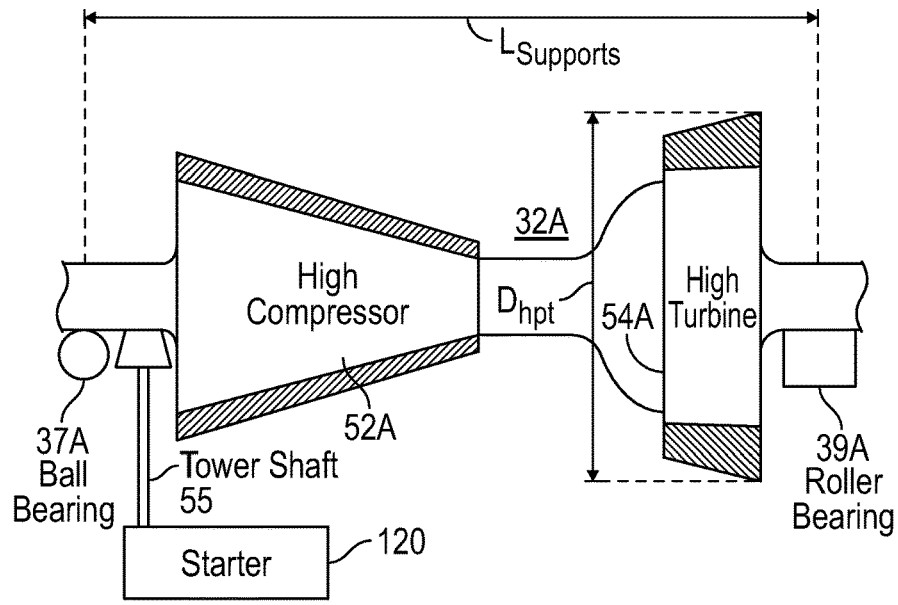
FIG. 9 is a schematic illustration of a high spool gas path with a straddle-mounted spool in accordance with an embodiment of the disclosure.
Figure 10:
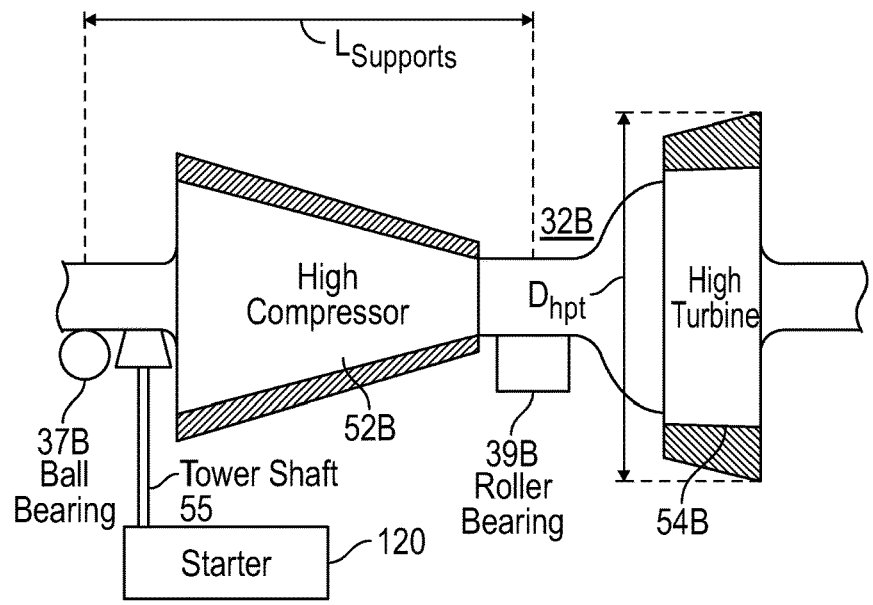
FIG. 10 is a schematic illustration of a high spool gas path with an overhung spool in accordance with an embodiment of the disclosure.

Although FIG. 1 depicts one example configuration, it will be understood that embodiments as described herein can cover a wide range of configurations. For example, embodiments may be implemented in a configuration that is described as a "straddle-mounted" spool 32A of FIG. 9. This configuration places two bearing compartments 37A and 39A (which may include a ball bearing and a roller bearing respectively), outside of the plane of most of the compressor disks of high pressure compressor 52A and at outside at least one of the turbine disks of high pressure turbine 54A. In contrast with a straddle-mounted spool arrangement, other embodiments may be implemented using an over-hung mounted spool 32B as depicted in FIG. 10. In over-hung mounted spool 32B, a bearing compartment 37B is located forward of the first turbine disk of high pressure turbine 54B such that the high pressure turbine 54B is overhung, and it is physically located aft of its main supporting structure. The use of straddle-mounted spools has advantages and disadvantages in the design of a gas turbine, but one characteristic of the straddle-mounted design is that the span between the bearing compartments 37A and 39A is long, making the amplitude of the high spot of a bowed rotor greater and the resonance speed that cannot be transited prior to temperature homogenization is lower. For any thrust rating, the straddle mounted arrangement, such as straddle-mounted spool 32A, gives Lsupport/Dhpt values that are higher, and the overhung mounted arrangement, such as overhung spool 32B, can be as much as 60% of the straddle-mounted Lsupport/Dhpt. Lsupport is the distance between bearings (e.g., between bearing compartments 37A and 39A or between bearing compartments 37B and 39B), and Dhpt is the diameter of the last blade of the high pressure turbine (e.g., high pressure turbine 54A or high pressure turbine 54B). As one example, a straddle-mounted engine starting spool, such as straddle-mounted spool 32A, with a roller bearing at bearing compartment 39A located aft of the high pressure turbine 54A may be more vulnerable to bowed rotor problems since the Lsupport/Dhpt ranges from 1.9 to 5.6. FIGS. 9 and 10 also illustrate a starter 120 interfacing via a tower shaft 55 with the straddle-mounted spool 32A proximate high compressor 52A and interfacing via tower shaft 55 with the overhung mounted spool 32B proximate high compressor 52B as part of a starting system.

Figure 2:
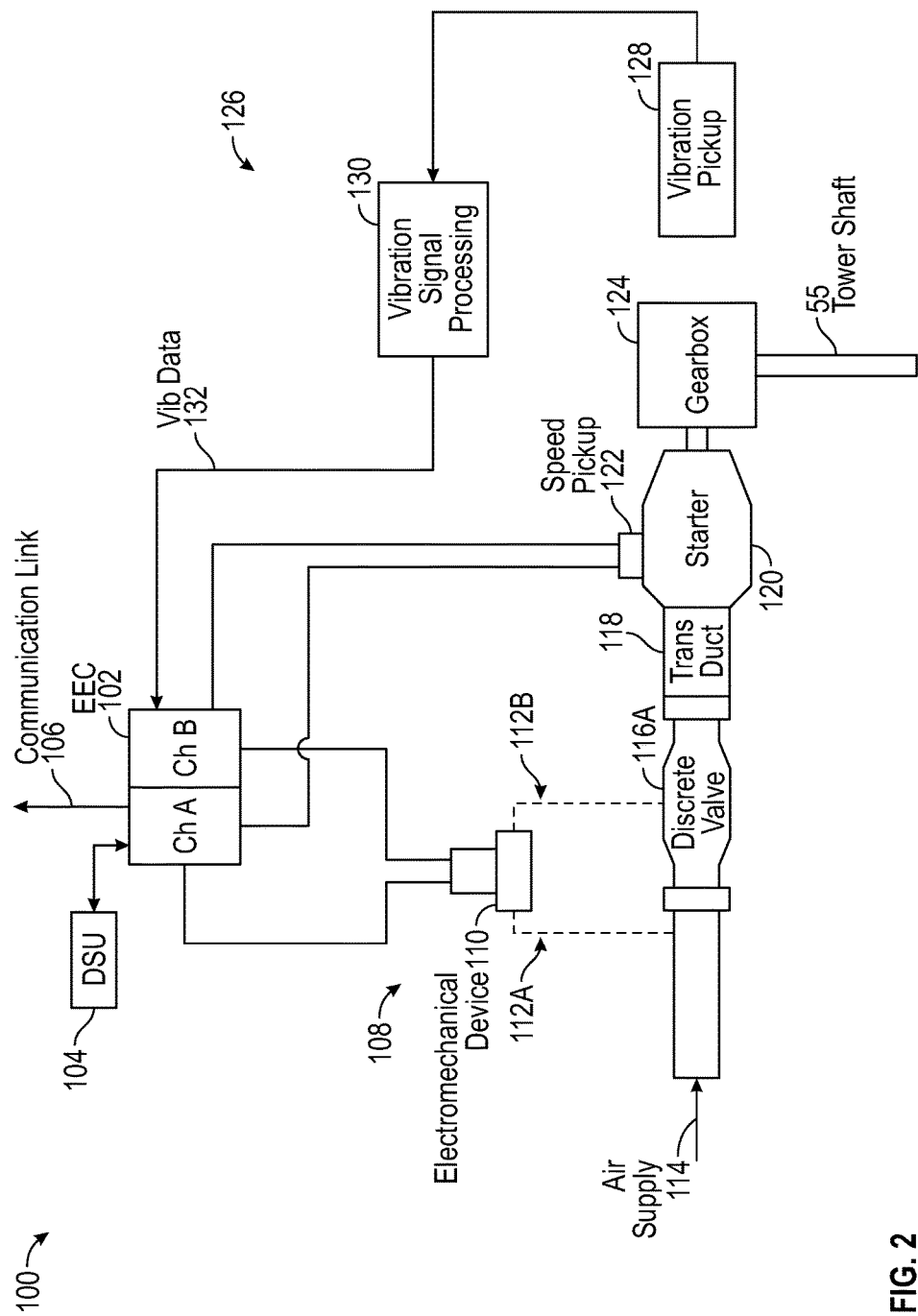
FIG. 2 is a schematic illustration of a starting system for a gas turbine engine in accordance with an embodiment of the disclosure.

Turning now to FIG. 2, a schematic of a starting system 100 for the gas turbine engine 10 of FIG. 1 is depicted according to an embodiment. The starting system 100 is also referred to generally as a gas turbine engine system. In the example of FIG. 2, the starting system 100 includes a controller 102 which may be an electronic engine control, such as a dual-channel FADEC, and/or engine health monitoring unit. In an embodiment, the controller 102 may include memory to store instructions that are executed by one or more processors. The executable instructions may be stored or organized in any manner and at any level of abstraction, such as in connection with a controlling and/or monitoring operation of the engine 10 of FIG. 1. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

The starting system 100 can also include a data storage unit (DSU) 104 that retains data between shutdowns of the gas turbine engine 10 of FIG. 1. The DSU 104 includes non-volatile memory and retains data between cycling of power to the controller 102 and DSU 104. A communication link 106 can include an aircraft and/or test stand communication bus to interface with aircraft controls, e.g., a cockpit, various onboard computer systems, and/or a test stand. Based on detecting a bowed rotor start risk, the controller 102 can send a request for extended idle operation on the communication link 106 prior to engine shutdown. Alternatively, the controller 102 can receive a request to initiate bowed rotor mitigation on the communication link 106.

A motoring system 108 is operable to drive rotation of a starting spool (e.g., high speed spool 32) of the gas turbine engine 10 of FIG. 1. Either or both channels of controller 102 can alternate on and off commands to an electromechanical device 110 coupled to a discrete starter valve 116A to achieve a partially open position of the discrete starter valve 116A to control a flow from a starter air supply 114 (also referred to as air supply 114) through a transfer duct 118 to an air turbine starter 120 (also referred to as starter 120 or pneumatic starter motor 120) to drive rotation of a starting spool of the gas turbine engine 10 below an engine idle speed. The air supply 114 (also referred to as starter air supply 114) can be provided by any known source of compressed air, such as an auxiliary power unit or ground cart.

The controller 102 can monitor a speed sensor, such as speed pickup 122 that may sense the speed of the engine rotor through its connection to a gearbox 124 which is in turn connected to the high speed spool 32 via tower shaft 55 (e.g., rotational speed of high speed spool 32) or any other such sensor for detecting or determining the speed of the gas turbine engine 10 of FIG. 1. The starter 120 may be coupled to the gearbox 124 of the gas turbine engine 10 of FIG. 1 directly or through a transmission such as a clutch system (not depicted). The controller 102 can establish a control loop with respect to rotor speed to adjust positioning of the discrete starter valve 116A.

The discrete starter valve 116A is an embodiment of a starter valve that is designed as an on/off valve which is typically commanded to either fully opened or fully closed. However, there is a time lag to achieve the fully open position and the fully closed position. By selectively alternating an on-command time with an off-command time through the electromechanical device 110, intermediate positioning states (i.e., partially opened/closed) can be achieved. The controller 102 can modulate the on and off commands (e.g., as a duty cycle using pulse width modulation) to the electromechanical device 110 to further open the discrete starter valve 116A and increase a rotational speed of the starting spool of the gas turbine engine 10 of FIG. 1. In an embodiment, the electromechanical device 110 has a cycle time defined between an off-command to an on-command to the off-command that is at most half of a movement time for the discrete starter valve 116A to transition from fully closed to fully open. Pneumatic lines 112A and 112B or a mechanical linkage (not depicted) can be used to drive the discrete starter valve 116A between the open position and the closed position. The electromechanical device 110 can be a solenoid that positions the discrete starter valve 116A based on intermittently supplied electric power as commanded by the controller 102. In an alternate embodiment, the electromechanical device 110 is an electric valve controlling muscle air to adjust the position of the discrete starter valve 116A as commanded by the controller 102.

In the example of FIG. 2, the engine also includes a vibration monitoring system 126. The vibration monitoring system 126 includes at least one vibration pickup 128, e.g., an accelerometer, operable to monitor vibration of the gas turbine engine 10 of FIG. 1. Vibration signal processing 130 can be performed locally with respect to the vibration pickup 128, within the controller 102, or through a separate vibration processing system, which may be part of an engine health monitoring system to acquire vibration data 132. Alternatively, the vibration monitoring system 126 can be omitted in some embodiments.

Figure 3:
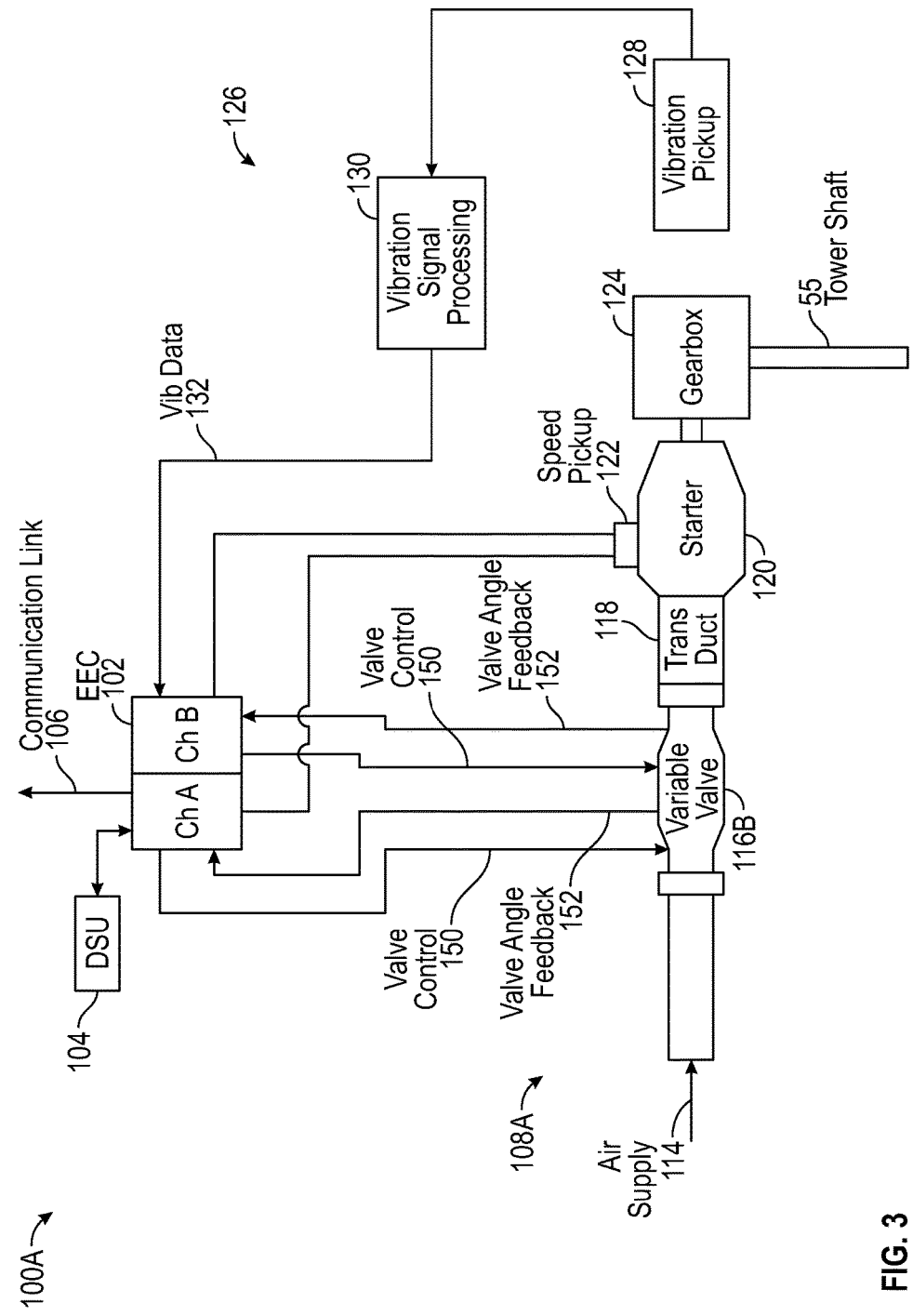
FIG. 3 is a schematic illustration of a starting system for a gas turbine engine in accordance with another embodiment of the disclosure.

Similar to FIG. 2, FIG. 3 is a schematic illustration of a starting system 100A for the gas turbine engine 10 of FIG. 1 in accordance with another embodiment. The starting system 100A includes controller 102 that controls motoring system 108A, as an alternate embodiment of the motoring system 108 of FIG. 2. Rather than using an electromechanical device 110 coupled to a discrete starter valve 116A to achieve a partially open position of the discrete starter valve 116A of FIG. 2, the motoring system 108A of FIG. 3 uses a variable position starter valve 116B. In FIG. 3, either or both channels of controller 102 can output a valve control signal 150 operable to dynamically adjust a valve angle of the variable position starter valve 116A that selectively allows a portion of the air supply 114 to pass through the variable position starter valve 116B and transfer duct 118 to air turbine starter 120. The variable position starter valve 116B is a continuous/infinitely adjustable valve that can hold a commanded valve angle, which may be expressed in terms of a percentage open/closed and/or an angular value (e.g., degrees or radians). Performance parameters of the variable position starter valve 116B can be selected to meet dynamic response requirements of the starting system 100A. For example, in some embodiments, the variable position starter valve 116B has a response rate of 0% to 100% open in less than 40 seconds. In other embodiments, the variable position starter valve 116B has a response rate of 0% to 100% open in less than 30 seconds. In further embodiments, the variable position starter valve 116B has a response rate of 0% to 100% open in less than 20 seconds.

The controller 102 can monitor a valve angle of the variable position starter valve 116B using valve angle feedback signals 152 provided to both channels of controller 102. As one example, in an active/standby configuration, both channels of the controller 102 can use the valve angle feedback signals 152 to track a current valve angle, while only one channel designated as an active channel outputs valve control signal 150. Upon a failure of the active channel, the standby channel of controller 102 can take over as the active channel to output valve control signal 150. In an alternate embodiment, both channels of controller 102 output all or a portion of a valve angle command simultaneously on the valve control signals 150. The controller 102 can establish an outer control loop with respect to rotor speed and an inner control loop with respect to the valve angle of the variable position starter valve 116B.

As in the example of FIG. 2, the starting system 100A of FIG. 3 also includes vibration monitoring system 126. The vibration monitoring system 126 includes at least one vibration pickup 128, e.g., an accelerometer, operable to monitor vibration of the gas turbine engine 10 of FIG. 1. Vibration signal processing 130 can be performed locally with respect to the vibration pickup 128, within the controller 102, or through a separate vibration processing system, which may be part of an engine health monitoring system to acquire vibration data 132. Alternatively, the vibration monitoring system 126 can be omitted in some embodiments.

Figure 4:
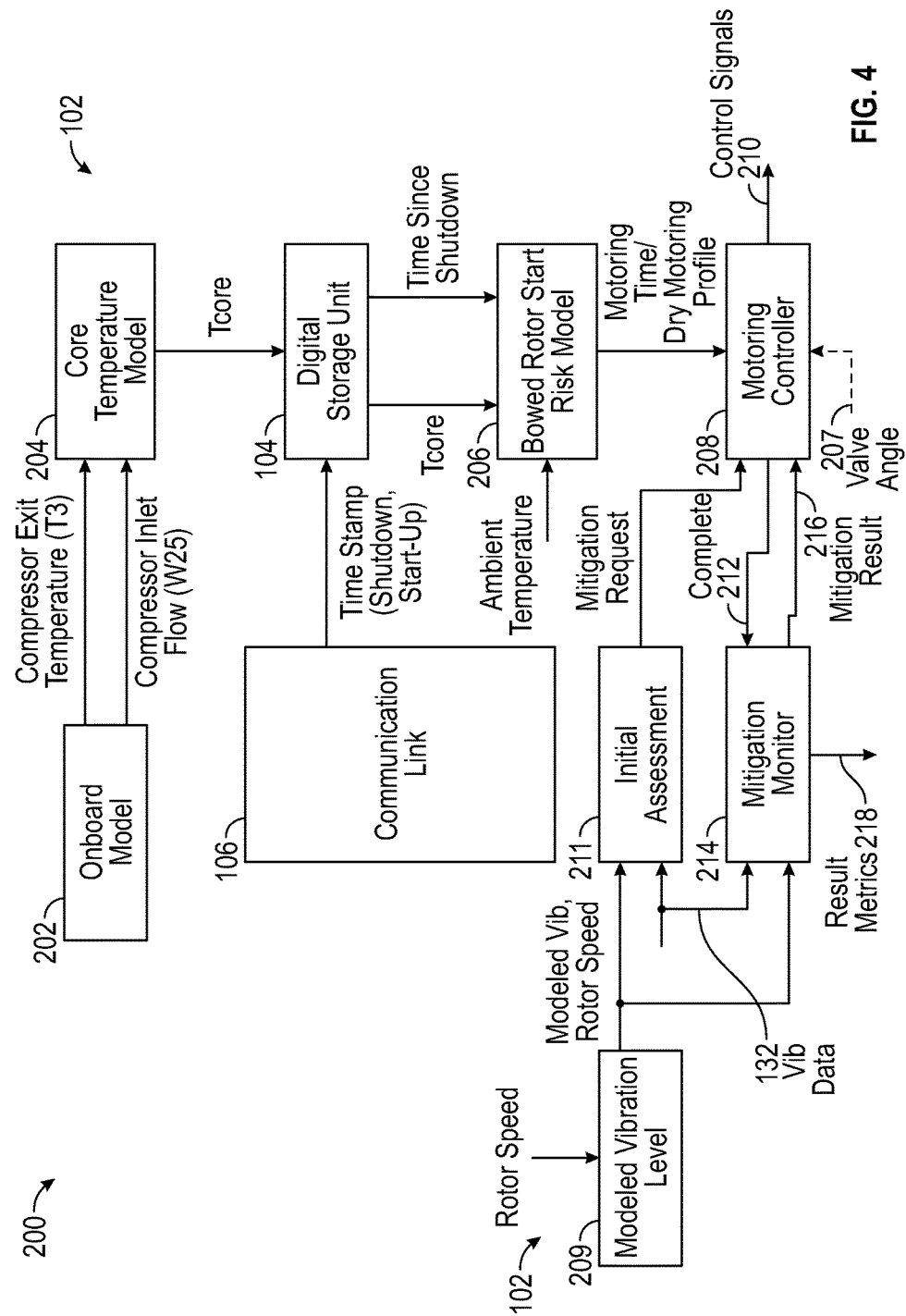
FIG. 4 is a block diagram of a system for bowed rotor start mitigation in accordance with an embodiment of the disclosure.

FIG. 4 is a block diagram of a system 200 for bowed rotor start mitigation that may control the discrete starter valve 116A of FIG. 2 or the variable position starter valve 116B of FIG. 3 via control signals 210 in accordance with an embodiment. The system 200 may also be referred to as a bowed rotor start mitigation system. In the example of FIG. 4, the system 200 includes an onboard model 202 operable to produce a compressor exit temperature $T_3$ and a compressor inlet flow $W_{25}$ for use by a core temperature model 204. The onboard model 202 is configured to synthesize or predict major temperatures and pressures throughout the gas turbine engine 10 of FIG. 1 beyond those sensed by sensors positioned about the gas turbine engine 10. The onboard model 202 and core temperature model 204 may both be part of controller 102.

Engine parameter synthesis is performed by the onboard model 202, and the engine parameter synthesis may be performed using the technologies described in U.S. Patent Publication No. 2011/0077783, the entire contents of which are incorporated herein by reference thereto. Of the many parameters synthesized by onboard model 202 at least two are outputted to the core temperature model 204, $T_3$, which is the compressor exit gas temperature of the engine 10 and $W_{25}$, which is the air flow through the compressor. Each of these values are synthesized by onboard model 202 and inputted into the core temperature model 204 that synthesizes or provides a heat state ($T_{core}$) of the gas turbine engine 10. $T_{core}$ can be determined by a first order lag or function of $T_3$ and a numerical value X (e.g., $f(T_3, X)$), wherein X is a value determined from a lookup table stored in memory of controller 102. Accordingly, X is dependent upon the synthesized value of $W_{25}$. In other words, $W_{25}$ when compared to a lookup table of the core temperature model 204 will determine a value X to be used in determining the heat state or $T_{core}$ of the engine 10. In one embodiment, the higher the value of $W_{25}$ or the higher the flow rate through the compressor the lower the value of X.

The heat state of the engine 10 during use or $T_{core}$ is determined or synthesized by the core temperature model 204 as the engine 10 is being run. In addition, $T_3$ and $W_{25}$ are determined or synthesized by the onboard model 202 and/or the controller 102 as the engine 10 is being operated.

At engine shutdown, the current or most recently determined heat state of the engine or $T_{core\ shutdown}$ of the engine 10 is recorded into DSU 104, and the time of the engine shutdown $t_{shutdown}$ is recorded into the DSU 104. Time values and other parameters may be received on communication link 106. As long as electrical power is present for the controller 102 and DSU 104, additional values of temperature data may be monitored for comparison with modeled temperature data to validate one or more temperature models (e.g., onboard model 202 and/or core temperature model 204) of the gas turbine engine 10.

During an engine start sequence or restart sequence, a bowed rotor start risk model 206 of the controller 102 is provided with the data stored in the DSU 104, namely $T_{core\ shutdown}$ and the time of the engine shutdown $t_{shutdown}$. In addition, the bowed rotor start risk model 206 is also provided with the time of engine start $t_{start}$ and the ambient temperature of the air provided to the inlet of the engine 10 $T_{inlet}$ or $T_2$. $T_2$ is a sensed value as opposed to the synthesized value of $T_3$.

The bowed rotor start risk model 206 maps core temperature model data with time data and ambient temperature data to establish a motoring time $t_{motoring}$ as an estimated period of motoring to mitigate a bowed rotor of the gas turbine engine 10. The motoring time $t_{motoring}$ is indicative of a bowed rotor risk parameter computed by the bowed rotor start risk model 206. For example, a higher risk of a bowed rotor may result in a longer duration of dry motoring to reduce a temperature gradient prior to starting the gas turbine engine 10 of FIG. 1. As will be discussed herein and in one embodiment, an engine start sequence may automatically include a modified start sequence; however, the duration of the modified start sequence prior to a normal start sequence will vary based upon the time period $t_{motoring}$ that is calculated by the bowed rotor start risk model 206. The motoring time $t_{motoring}$ for predetermined target speed $N_{target}$ of the engine 10 is calculated as a function of $T_{core\ shutdown}$, $t_{shutdown}$, $t_{start}$ and $T_2$, (e.g., $f(T_{core\ shutdown}, t_{shutdown}, t_{start}$ and $T_2$) while a target speed $N_{target}$ is a predetermined speed that can be fixed or vary within a predetermined speed range of $N_{targetMin}$ to $N_{targetMax}$. In other words, the target speed $N_{target}$ may be the same regardless of the calculated time period $t_{motoring}$ or may vary within the predetermined speed range of $N_{targetMin}$ to $N_{targetMax}$. The target speed $N_{target}$ may also be referred to as a dry motoring mode speed.

Based upon these values ($T_{core\ shutdown}, t_{shutdown}, t_{start}$ and $T_2$) the motoring time $t_{motoring}$ at a predetermined target speed $N_{target}$ for the modified start sequence of the engine 10 is determined by the bowed rotor start risk model 206. Based upon the calculated time period $t_{motoring}$ which is calculated as a time to run the engine 10 at a predetermined target speed $N_{target}$ in order to clear a "bowed condition". In accordance with an embodiment of the disclosure, the controller 102 can run through a modified start sequence upon a start command given to the engine 10 by an operator of the engine 10 such as a pilot of an airplane the engine is used with. It is understood that the motoring time $t_{motoring}$ of the modified start sequence may be in a range of 0 seconds to minutes, which, of course, depends on the values of $T_{core\ shutdown}$, $t_{shutdown}$, $t_{start}$ and $T_2$.

In an alternate embodiment, the modified start sequence may only be run when the bowed rotor start risk model 206 has determined that the motoring time $t_{motoring}$ is greater than zero seconds upon receipt of a start command given to the engine 10. In this embodiment and if the bowed rotor start risk model 206 has determined that $t_{motoring}$ is not greater than zero seconds, a normal start sequence will be initiated upon receipt of a start command to the engine 10.

Accordingly and during an engine command start, the bowed rotor start risk model 206 of the system 200 may be referenced wherein the bowed rotor start risk model 206 correlates the elapsed time since the last engine shutdown time and the shutdown heat state of the engine 10 as well as the current start time $t_{start}$ and the inlet air temperature $T_2$ in order to determine the duration of the modified start sequence wherein motoring of the engine 10 at a reduced speed $N_{target}$ without fuel and ignition is required. As used herein, motoring of the engine 10 in a modified start sequence refers to the turning of a starting spool by the starter 120 at a reduced speed $N_{target}$ without introduction of fuel and an ignition source in order to cool the engine 10 to a point wherein a normal start sequence can be implemented without starting the engine 10 in a bowed rotor state. In other words, cool or ambient air is drawn into the engine 10 while motoring the engine 10 at a reduced speed in order to clear the "bowed rotor" condition, which is referred to as a dry motoring mode.

The bowed rotor start risk model 206 can output the motoring time $t_{motoring}$ to a motoring controller 208. The motoring controller 208 uses a dynamic control calculation in order to determine a required valve position of the starter valve 116A, 116B used to supply an air supply or starter air supply 114 to the engine 10 in order to limit the motoring speed of the engine 10 to the target speed $N_{target}$ due to the position of the starter valve 116A, 116B. The required valve position of the starter valve 116A, 116B can be determined based upon an air supply pressure as well as other factors including but not limited to ambient air temperature, parasitic drag on the engine 10 from a variety of engine driven components such as electric generators and hydraulic pumps, and other variables such that the motoring controller 208 closes the loop for an engine motoring speed target $N_{target}$ for the required amount of time based on the output of the bowed rotor start risk model 206. In one embodiment, the dynamic control of the valve position (e.g., open state of the valve (e.g., fully open, ½ open, ¼ open, etc.) in order to limit the motoring speed of the engine 10) is controlled via duty cycle control (on/off timing using pulse width modulation) of electromechanical device 110 for discrete starter valve 116A.

When the variable position starter valve 116B of FIG. 3 is used, a valve angle 207 can be provided to motoring control 208 based on the valve angle feedback 152 of FIG. 3. A rotor speed N2 (i.e., speed of high speed spool 32) can be provided to the motoring controller 208 and a mitigation monitor 214, where motoring controller 208 and a mitigation monitor 214 may be part of controller 102. Vibration data 132 can also be provided to mitigation monitor 214.

The risk model 206 can determine a bowed rotor risk parameter that is based on the heat stored ($T_{core}$) using a mapping function or lookup table. When not implemented as a fixed rotor speed, the bowed rotor risk parameter can have an associated dry motoring profile defining a target rotor speed profile over an anticipated amount of time for the motoring controller 208 to send control signals 210, such as valve control signals 150 for controlling variable position starter valve 116B of FIG. 3.

Figure 5:
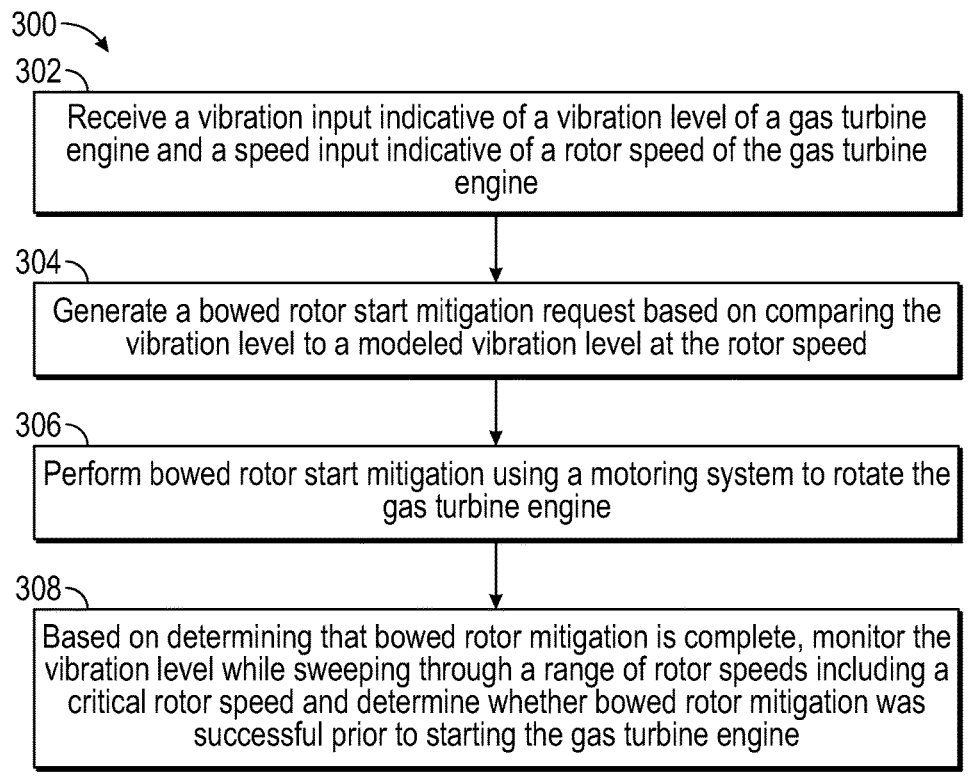
FIG. 5 is a flow chart illustrating a method of bowed rotor start mitigation of a gas turbine engine in accordance with an embodiment of the disclosure.
Figure 6:
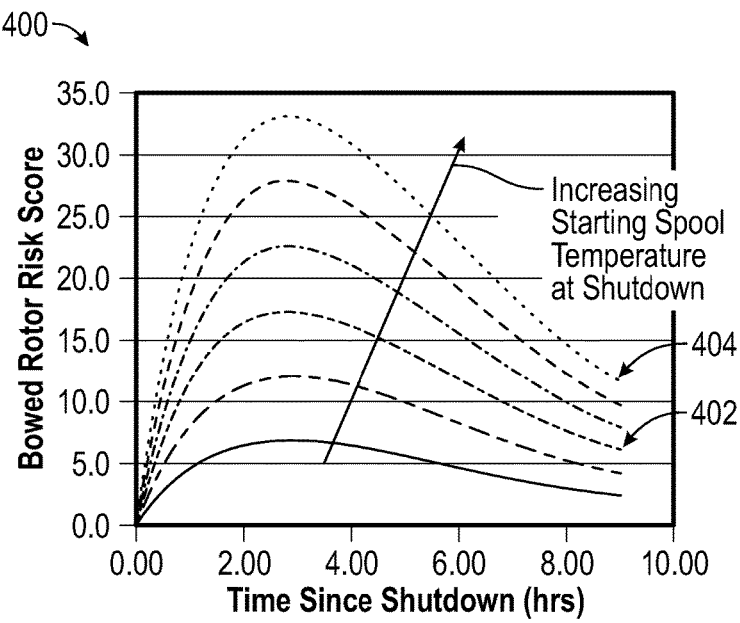
FIG. 6 is a graph illustrating a bowed rotor risk score with respect to time in accordance with an embodiment of the disclosure.

The bowed rotor risk parameter may be quantified according to a profile curve 402 selected from a family of curves 404 that align with observed aircraft/engine conditions that impact turbine bore temperature and the resulting bowed rotor risk as depicted in the example graph 400 of FIG. 5.

In some embodiments, an anticipated amount of dry motoring time can be used to determine a target rotor speed profile in a dry motoring profile for the currently observed conditions. As one example, one or more baseline characteristic curves for the target rotor speed profile can be defined in tables or according to functions that may be rescaled to align with the observed conditions. An example of a target rotor speed profile 1002 is depicted in graph 1000 of FIG. 12 that includes a steep initial transition portion 1004, followed by a gradually increasing portion 1006, and a late acceleration portion 1008 that increases rotor speed above a critical rotor speed, through a fuel-on speed and an engine idle speed. The target rotor speed profile 1002 can be rescaled with respect to time and/or select portions (e.g., portions 1004, 1006, 1008) of the target rotor speed profile 1002 can be individually or collectively rescaled (e.g., slope changes) with respect to time to extend or reduce the total motoring time. The target rotor speed profile 1002 may include all positive slope values such that the actual rotor speed 1010 is driven to essentially increase continuously while bowed rotor start mitigation is active. While the example of FIG. 12 depicts one example of the target rotor speed profile 1002 that can be defined in a dry motoring profile, it will be understood that many variations are possible in embodiments.

Figure 11:
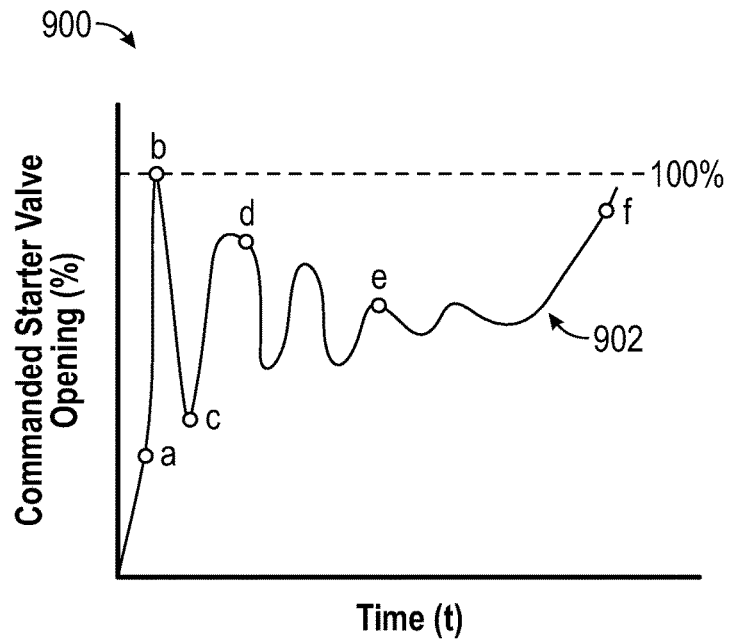
FIG. 11 is a graph illustrating commanded starter valve opening with respect to time in accordance with an embodiment of the disclosure.
Figure 12:
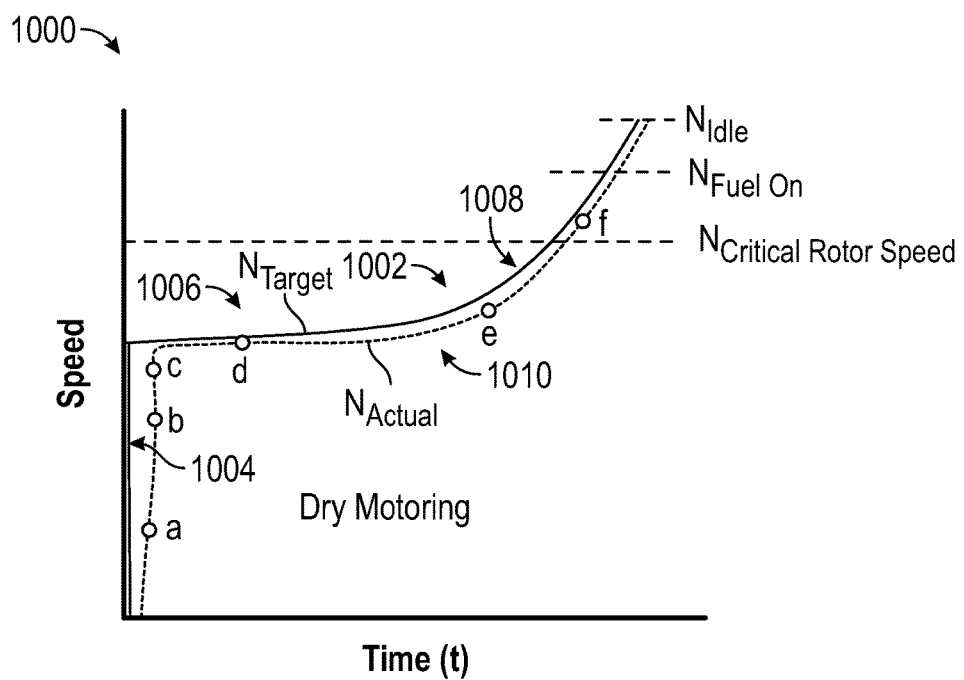
FIG. 12 is a graph illustrating a target rotor speed profile of a dry motoring profile and an actual rotor speed versus time in accordance with an embodiment of the disclosure.

The example of FIG. 11 illustrates how a valve angle command 902 can be adjusted between 0 to 100% of a commanded starter valve opening to generate the actual rotor speed 1010 of FIG. 12. As the actual rotor speed 1010 tracks to the steep initial transition portion 1004 of the target rotor speed profile 1002, the valve angle command 902 transitions through points "a" and "b" to fully open the variable position starter valve 116B. As the slope of the target rotor speed profile 1002 is reduced in the gradually increasing portion 1006, the valve angle command 902 is reduced between points "b" and "c" to prevent the actual rotor speed 1010 from overshooting the target rotor speed profile 1002. In some embodiments, decisions to increase or decrease the commanded starter valve opening is based on monitoring a rate of change of the actual rotor speed 1010 and projecting whether the actual rotor speed 1010 will align with the target rotor speed profile 1002 at a future time. If it is determined that the actual rotor speed 1010 will not align with the target rotor speed profile 1002 at a future time, then the valve angle of the variable position starter valve 116B is adjusted (e.g., increase or decrease the valve angle command 902) at a corresponding time. In the example of FIGS. 11 and 12, the valve angle command 902 oscillates with a gradually reduced amplitude between points "c", "d", and "e" as the actual rotor speed 1010 tracks to the target rotor speed profile 1002 through the gradually increasing portion 1006. As dry motoring continues, the overall homogenization of the engine 10 increases, which allows the actual rotor speed 1010 to safely approach the critical rotor speed without risking damage. The valve angle command transitions from point "e" to point "f" and beyond to further increase the actual rotor speed 1010 in the late acceleration portion 1008 above the critical rotor speed, through a fuel-on speed and an engine idle speed. By continuously increasing the actual rotor speed 1010 during dry motoring, the bowed rotor condition can be reduced faster than holding a constant slower speed.

With further reference to FIG. 4, the motoring controller 208 may also be operable to receive a mitigation request from an initial assessment 211 and a mitigation result from a mitigation monitor 214 of controller 102. In the example of FIG. 4, a modeled vibration level 209 may be computed based on a rotor speed (e.g., a starting spool speed) of the gas turbine engine 10 of FIG. 1. The modeled vibration level 209 and rotor speed can be provided with vibration data 132 along with other data to the initial assessment 211 and mitigation monitor 214. The mitigation monitor 214 can operate periodically or in response to receiving a complete indicator to run a verification of the bowed rotor mitigation. The mitigation monitor 214 can provide mitigation results to the motoring controller 208 and may provide result metrics to other systems, such a maintenance request or indicator.

As one example of an aircraft that includes systems as described herein, onboard model 202 and core temperature model 204 may run on controller 102 of the aircraft to track heat stored ($T_{core}$) in the turbine at the time of engine shutdown. Modeling of potential heat stored in the system may be performed as a turbine disk metal temperature model in the core temperature model 204. When the aircraft lands, engines typically operate at idle for a cool down period of time, e.g., while taxiing to a final destination. When an engine shutdown is detected, model state data can be logged by the DSU 104 prior to depowering. When the controller 102 powers on at a later time and model state data can be retrieved from the DSU 104, and the bowed rotor start risk model 206 can be updated to account for the elapsed time. When an engine start is requested, a bowed rotor risk can be assessed with respect to the bowed rotor start risk model 206. Extended dry motoring can be performed during an engine start process until the bow risk has sufficiently diminished. Peak vibrations can be checked by the mitigation monitor 214 during the start processes to confirm that bowed rotor mitigation successfully removed the bowed rotor condition.

In reference to FIGS. 4 and 12, the mitigation monitor 214 of FIG. 4 can operate in response to receiving a complete indicator 212 to run a verification of the bowed rotor mitigation. The mitigation monitor 214 can provide mitigation results 216 to the motoring controller 208 and may provide result metrics 218 to other systems, such a maintenance request or indicator. Peak vibrations can be checked by the mitigation monitor 214 during the start processes to confirm that bowed rotor mitigation successfully removed the bowed rotor condition. The mitigation monitor 214 may also run while dry motoring is active to determine whether adjustments to the dry motoring profile are needed. For example, if a greater amount of vibration is detected than was expected, the mitigation monitor 214 can request that the motoring controller 208 reduce a slope of the target rotor speed profile 1002 of FIG. 12 to extend the dry motoring time before driving the actual rotor speed 1010 of FIG. 12 up to the critical rotor speed. Similarly, if the magnitude of vibration observed by the mitigation monitor 214 is less than expected, the mitigation monitor 214 can request that the motoring controller 208 increase a slope of the target rotor speed profile 1002 of FIG. 12 to reduce the dry motoring time before driving the actual rotor speed 1010 of FIG. 12 up to the critical rotor speed.

FIG. 5 is a flow chart illustrating a method 300 of bowed rotor start mitigation of a gas turbine engine in accordance with an embodiment. The method 300 of FIG. 5 is described in reference to FIGS. 1-12 and may be performed with an alternate order and include additional steps. At block 302, the controller 102 receives a vibration input indicative of an actual vibration level of the gas turbine engine 10 and a speed input indicative of a rotor speed of the gas turbine engine 10. For clarity the term "actual vibration" is used to distinguish the vibrations caused by the engine from a vibration model, and the "actual vibration" may be measured at the engine, or elsewhere on the aircraft. The vibration input can be vibration data 132 from vibration signal processing 130. The speed input may be directly or indirectly indicative of the rotational speed of high speed spool 32, for instance, derived from a rotational speed of gearbox 124, from speed pickup 122, or another source (not depicted).

At block 304, the controller 102 can generate a bowed rotor start mitigation request based on comparing the actual vibration level to a modeled vibration level 209 at the rotor speed. The modeled vibration level 209 may be determined based on the rotor speed and provided to initial assessment 211 along with vibration data 132 to generate the bowed rotor start mitigation request to motoring controller 208. Performance of the comparing of the actual vibration level to the modeled vibration level 209 at the rotor speed may be triggered at a rotor speed threshold that is below a resonance speed of the gas turbine engine 10. The controller 102 is operable to perform the comparing of the actual vibration level to the modeled vibration level 209 during a dry motoring mode of the gas turbine engine 10 below a resonance speed of the rotor. For example, the bowed rotor start risk model 206 may detect a likelihood of a bowed rotor condition and start dry motoring by increasing the rotor speed of the gas turbine engine 10 up to a dry motoring mode speed (e.g., $N_{target}$). The controller 102 can drive motoring of the gas turbine engine 10 to a bowed rotor mode determination speed that is less than the dry motoring mode speed to perform the comparing of the actual vibration level to the modeled vibration level 209 at a range of rotor speeds up to the bowed rotor mode determination speed prior to reaching the dry motoring mode speed.

Data for the bowed rotor start risk model 206 can be recorded in the DSU 104, including time and temperature data. The DSU 104 may be operable to continue monitoring and storing of temperature data while the gas turbine engine 10 is shutdown if electrical power is provided to the DSU 104 and controller 102. Extended monitoring after engine shutdown can be used to enhance modeling results, as less of a time gap exists between engine shutdown and start-up.

At block 306, bowed rotor start mitigation can be performed using motoring system 108, 108A to rotate a starting spool of the gas turbine engine 10. The controller 102 may periodically perform comparing of the vibration level to the modeled vibration level 209 in the dry motoring mode to determine whether bowed rotor mitigation has completed prior to reaching a motoring time $t_{motoring}$ and prior to reaching an engine starting time. The motoring time $t_{motoring}$ may be determined by the bowed rotor start risk model 206 as an expected amount of time need to run the air turbine starter 120 at a starter speed based on time and temperature values prior to starting the engine. Similarly, the bowed rotor start mitigation request from the initial assessment 211 may include an estimated need and duration of pre-start dry motoring. The motoring controller 208 can compare the duration of pre-start dry motoring to the motoring time determined by the risk model 206 and select a lesser value of the duration of pre-start dry motoring and the motoring time. For instance, the motoring time $t_{motoring}$ determined by the bowed rotor start risk model 206 may be a worst case time that does not account for other factors that may cool the gas turbine engine 10 faster than modeled, such as wind. The initial assessment 211 may determine that a present bowed rotor condition is less than the modeled value, and thus the total actual motoring time can be reduced. In other words, the motoring controller 208 can determine whether to reduce the motoring time $t_{motoring}$ based on a result of comparing the actual vibration level to the modeled vibration level at the rotor speed. Similarly, comparing the actual vibration level to the modeled vibration level may be used to adjust a dry motoring profile.

At block 308, based on determining that bowed rotor mitigation is complete, the controller 102 is operable to monitor the vibration level while sweeping through a range of rotor speeds including a critical rotor speed and determine whether bowed rotor mitigation was successful prior to starting the gas turbine engine 10. The mitigation monitor 214 may receive a completion signal from the motoring controller 208 when the motoring controller 208 has completed dry motoring, for instance, if the motoring time $t_{motoring}$ has elapsed. If the mitigation monitor 214 determines that the bowed rotor condition still exists based on vibration data 132 collected, the motoring controller 208 may restart dry motoring, or a maintenance request or indicator can be triggered along with providing result metrics for further analysis. Metrics of attempted bowed rotor mitigation can be recorded in the DSU 104 based on determining that the attempted bowed rotor mitigation was unsuccessful or incomplete.

Figure 7:
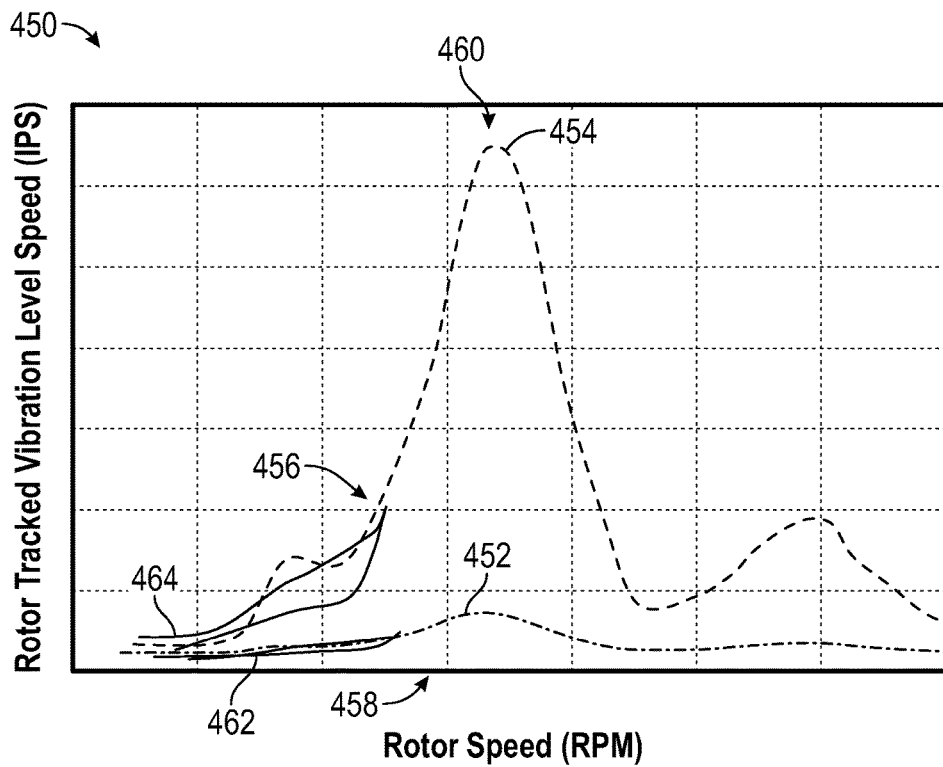
FIG. 7 is a graph illustrating vibration levels used in an initial assessment of a bowed rotor condition in accordance with an embodiment of the disclosure.

Referring now to FIG. 7, a graph 450 illustrating vibration levels used in an initial assessment of a bowed rotor condition is depicted. A vibration model used to determine the modeled vibration level 209 of FIG. 4 can include a family of curves with a range of expected vibrations ranging from a non-bowed rotor condition vibration model 452 to a worst case bowed rotor condition model 454. The initial assessment 211 of FIG. 4 can request that the motoring controller 208 drive rotation of the gas turbine engine 10 at a rotor speed (e.g., a high pressure turbine speed) up to a bowed rotor mode determination speed 456 that is less than a dry motoring mode speed 458 and also less than a critical rotor speed 460 while monitoring vibration data 132. The bowed rotor mode determination speed 456 establishes a pre-check at a lower rotor speed than the resonance speed (i.e., critical rotor speed 460). The bowed rotor mode determination speed 456 may be as high as 85% of the critical rotor speed 460. A pre-check at the bowed rotor mode determination speed 456 may call for more or less time homogenizing the rotor depending on the level of vibration observed. In an embodiment, during a pre-check, the actual vibration level may be sampled below twenty-five percent of the resonance speed of the rotor to predict whether vibration amplitude of the rotor will be unacceptable for transiting the resonance speed.

In the example of FIG. 7, the dry motoring mode speed 458 is the nominal speed at which the high speed spool 32 of FIG. 1 rotates during dry motoring at steady state. The critical speed 460 is the speed at which a vibration peak is expected due to amplification effects of a bowed rotor condition along with other contributions to vibration level generally. Upon reaching the bowed rotor mode determination speed 456, motoring is reduced while still monitoring the vibration data 132. A recorded vibration signature 462 that closely aligns with a portion of the non-bowed rotor condition vibration model 452 may be indicative of no bowed rotor condition. A recorded vibration signature 464 that closely aligns with a portion of the worst case bowed rotor condition model 454 may be indicative of a worst case bowed rotor condition. Additional models ranging between the non-bowed rotor condition vibration model 452 and the worst case bowed rotor condition model 454 may be used to approximate various degrees of a bowed rotor condition.

Figure 8:
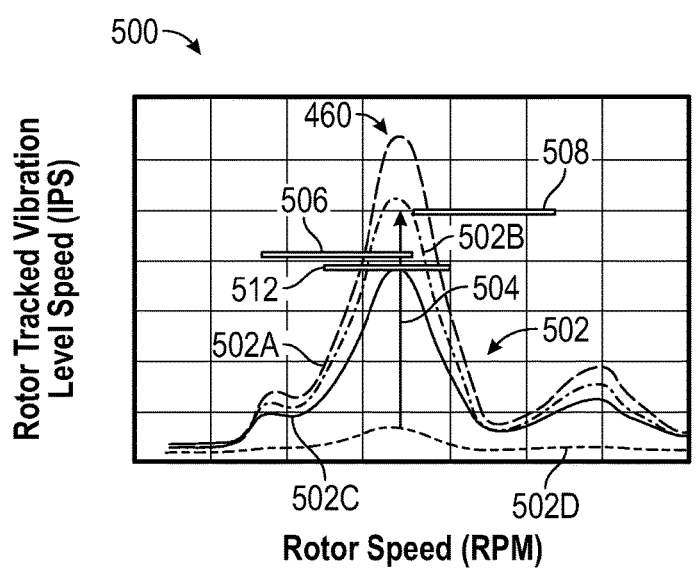
FIG. 8 is a graph illustrating examples of various vibration level profiles of an engine in accordance with an embodiment of the disclosure.

Referring now to FIG. 8, a graph 500 illustrating examples of various vibration level profiles 502 of an engine, such as gas turbine engine 10 of FIG. 1 is depicted. The vibration level profiles 502 represent a variety of possible vibration levels observed before and/or after performing bowed rotor mitigation. Critical rotor speed 460 is the speed at which a vibration peak is expected due to amplification effects of a bowed rotor condition along with other contributions to vibration level generally. A peak vibration 504 at critical rotor speed 460 may be used to trigger different events. For example, if the peak vibration 504 at critical rotor speed 460 is below a maintenance action threshold 506, then no further actions may be needed. If the peak vibration 504 at critical rotor speed 460 is above a damage risk threshold 508, then an urgent maintenance action may be requested such as an engine check. If the peak vibration 504 at critical rotor speed 460 is between the maintenance action threshold 506 and the damage risk threshold 508, then further bowed rotor mitigation actions may be requested, such as extending/restarting dry motoring. In one embodiment, a maintenance request is triggered based on the actual vibration level exceeding maintenance action threshold 506 after completing an attempt of bowed rotor mitigation.

The lowest rotor vibration vs. speed in FIG. 8 (vibration profile 502D) is for a fully homogenized rotor, where mitigation is not necessary (engine parked all night long, for example). The next higher curve shows a mildly bowed rotor and so on. The maintenance action threshold 506 is a threshold for setting a maintenance flag such as requiring a troubleshooting routine of one or more system elements. The damage risk threshold 508 may be a threshold to trigger a more urgent maintenance requirement up to and including an engine check. As dry motoring is performed in embodiments, the gas turbine engine 10 may shift between vibration profiles. For instance, when a bow rotor condition is present, the gas turbine engine 10 may experience vibration levels according to vibration profile 502A, if mitigation is not performed. As dry motoring is run, the gas turbine engine 10 may have a vibration profile that is gradually reduced from vibration profile 502A to vibration profile 502B and then vibration profile 502C, for example. By checking the current vibration level at a corresponding rotor speed with respect to time, the controller 102 can determine whether adjustments are needed to extend or reduce the slope of the target rotor speed profile 1002 of FIG. 12 depending on an expected rate of bowed rotor reduction. In embodiments, a slope of the target rotor speed profile 1002 in the dry motoring profile 206 can be adjusted and maintains a positive slope while bowed rotor start mitigation is active based on determining that a vibration level of the gas turbine engine 10 is less than a targeted maximum range 512, which may define a safe level of vibration to ensure that no risk of a maintenance action or damage will likely occur if the actual rotor speed 1010 is increased faster than previously planned.

Accordingly and as mentioned above, it is desirable to detect, prevent and/or clear a "bowed rotor" condition in a gas turbine engine that may occur after the engine has been shut down. As described herein and in one non-limiting embodiment, the controller 102 may be programmed to automatically take the necessary measures in order to provide for a modified start sequence without pilot intervention other than the initial start request. In an exemplary embodiment, the controller 102 and/or DSU 104 comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the controller 102 and/or DSU 104 may include, but not be limited to, a processor(s), computer(s), memory, storage, register(s), timing, interrupt(s), communication interfaces, and input/output signal interfaces, as well as combinations comprising at least one of the foregoing. For example, the controller 102 and/or DSU 104 may include input signal filtering to enable accurate sampling and conversion or acquisitions of such signals from communications interfaces. As described above, exemplary embodiments of the disclosure can be implemented through computer-implemented processes and apparatuses for practicing those processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A bowed rotor start mitigation system for a gas turbine engine, the bowed rotor start mitigation system comprising:
   a controller operable to receive a vibration input indicative of an actual vibration level of the gas turbine engine and a speed input indicative of a rotor speed of the gas turbine engine, the controller generating a bowed rotor start mitigation request based on comparing the actual vibration level to a modeled vibration level at the rotor speed;
   a motoring controller operable to determine whether to reduce a motoring time determined by a risk model based on a result of comparing the actual vibration level to the modelled vibration level at the rotor speed, wherein the risk model maps core temperature model data with time data and ambient temperature data to establish the motoring time as an estimated period of motoring to mitigate a bowed rotor of the gas turbine engine; and
   a digital storage unit operable to store time and temperature data for the risk model, wherein the digital storage unit is operable to continue monitoring of temperature data while the gas turbine engine is shut down and the bowed rotor start mitigation system is operable to compare monitored temperature data with modelled temperature data to validate one or more temperature models of the gas turbine engine.

2. The bowed rotor start mitigation system as in claim 1, wherein comparing the actual vibration level to the modeled vibration level at the rotor speed is triggered to be performed at a rotor speed threshold that is below a resonance speed of the gas turbine engine.

3. The bowed rotor start mitigation system as in claim 1, wherein the controller is operable to perform the comparing of the actual vibration level to the modeled vibration level during a dry motoring mode of the gas turbine engine below a resonance speed of the rotor.

4. The bowed rotor start mitigation system as in claim 3, wherein the controller drives motoring of the gas turbine engine to a bowed rotor mode determination speed that is less than a dry motoring mode speed to perform the comparing of the actual vibration level to the modeled vibration level at a range of rotor speeds up to the bowed rotor mode determination speed prior to reaching the dry motoring mode speed.

5. The bowed rotor start mitigation system as in claim 3, wherein the controller periodically performs the comparing of the actual vibration level to the modeled vibration level in the dry motoring mode to determine whether bowed rotor mitigation has completed prior to reaching an engine starting time.

6. The bowed rotor start mitigation system as in claim 1, wherein metrics of attempted bowed rotor mitigation are recorded based on determining that the attempted bowed rotor mitigation was unsuccessful or incomplete.

7. A gas turbine engine system comprising:
   a motoring system operable to drive rotation of the gas turbine engine;
   a vibration monitoring system operable to monitor actual vibration of the gas turbine engine;
   an electronic engine control operable to receive a vibration input indicative of an actual vibration level from the vibration monitoring system and a speed input indicative of a rotor speed of the gas turbine engine, the electronic engine control generating a bowed rotor start mitigation request that drives the motoring system to perform bowed rotor mitigation based on comparing the actual vibration level to a modeled vibration level at the rotor speed; and
   a motoring controller operable to determine whether to reduce a motoring time determined by a risk model based on a result of comparing the actual vibration level to the modelled vibration level at the rotor speed, wherein the risk model establishes the motoring time based on temperature data as an estimated period of motoring to mitigate a bowed rotor of the gas turbine engine.

8. The gas turbine engine as in claim 7, wherein the actual vibration level is sampled below twenty-five percent of a resonance speed of the rotor to predict whether vibration amplitude of the rotor will be unacceptable for transiting the resonance speed.

9. The gas turbine engine as in claim 7, wherein a maintenance request is triggered based on the actual vibration level exceeding a maintenance action threshold after completing an attempt of bowed rotor mitigation.

10. A method of bowed rotor start mitigation for a gas turbine engine, the method comprising:
    receiving a vibration input indicative of an actual vibration level of the gas turbine engine;
    receiving a speed input indicative of a rotor speed of the gas turbine engine;
    generating, by a controller, a bowed rotor start mitigation request based on comparing the actual vibration level to a modeled vibration level at the rotor speed;

determining whether to reduce a motoring time determined by a risk model based on a result of comparing the actual vibration level to the modelled vibration level at the rotor speed, wherein the risk model maps core temperature model data with time data and ambient temperature data to establish the motoring time as an estimated period of motoring to mitigate a bowed rotor of the gas turbine engine;

continuing monitoring of temperature data while the gas turbine engine is shutdown; and comparing monitored temperature data with modelled temperature data to validate one or more temperature models of the gas turbine engine.

11. The method as in claim 10, further comprising:
triggering the comparing of the actual vibration level to the modeled vibration level at a rotor speed threshold that is below a resonance speed of the gas turbine engine.

12. The method as in claim 10, wherein the comparing of the actual vibration level to the modeled vibration level is performed during a dry motoring mode of the gas turbine engine below a resonance speed of the rotor.

13. The method as in claim 12, further comprising:
driving motoring of the gas turbine engine to a bowed rotor mode determination speed that is less than a dry motoring mode speed to perform the comparing of the actual vibration level to the modeled vibration level at a range of rotor speeds up to the bowed rotor mode determination speed prior to reaching the dry motoring mode speed.

14. The method as in claim 12, further comprising:
periodically performing the comparing of the actual vibration level to the modeled vibration level in the dry motoring mode to determine whether bowed rotor mitigation has completed prior to reaching an engine starting time.

15. The method as in claim 10, further comprising:
recording metrics of attempted bowed rotor mitigation based on determining that the attempted bowed rotor mitigation was unsuccessful or incomplete.

16. The method as in claim 10, further comprising:
triggering a maintenance request based on determining that the actual vibration level exceeds a maintenance action threshold after completing an attempt of bowed rotor mitigation.

* * * * *